Feb. 16, 1932.  J. R. OISHEI  1,845,808

REAR VIEW MIRROR

Filed Aug. 15, 1927  2 Sheets-Sheet 1

Inventor
John R. Oishei
by Barton A. Beam
Attorney

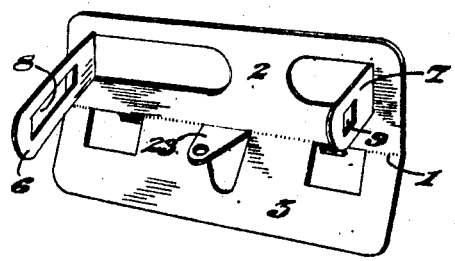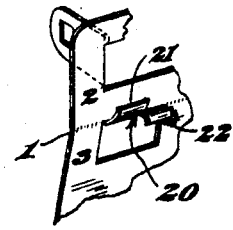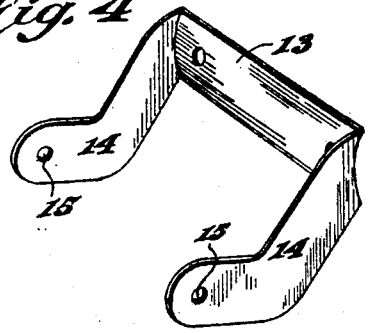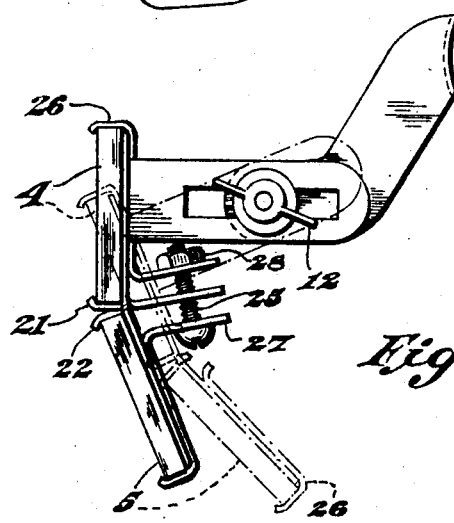

Patented Feb. 16, 1932

1,845,808

UNITED STATES PATENT OFFICE

JOHN R. OISHEI, OF BUFFALO, NEW YORK, ASSIGNOR TO TRICO PRODUCTS CORPORATION, OF BUFFALO, NEW YORK

REAR VIEW MIRROR

Application filed August 15, 1927. Serial No. 212,893.

This invention relates to a rear view mirror especially adapted for motor vehicles.

These mirrors are usually mounted above or adjacent the upper edge of the windshield immediately in front of the driver so as to give him a reflected view of traffic conditions at the rear of his machine. The mirror, therefore, is an essential element for safe driving if properly controllable to avoid the reflection of objectionable conditions, such as brilliant headlights and other glaring lights during night driving, for obviously such reflection annoys and more or less blinds the driver to such an extent that he is either compelled to change his position so as to get out of the zone of reflected light, or else to adjust the mirror to a non-reflecting position where it is of no utility whatsoever. With the brilliantly reflected light shining into his face the motorist is not only confused but is compelled to proceed slowly and exceedingly cautiously, this being especially true in cities with heavy traffic and a multitude of street and other lights before and about him.

Attempts have been made to control the reflected light for night driving such as by using glare shields or modifying the reflector but in these embodiments the resultant structures have been crude and impractical and not readily adjustable to the most efficient position.

The present invention resides in a rear view mirror having a controllable reflector, and it has for its primary object to provide a combined brilliant and subdued reflector which will be of simple and practical nature and which may be readily controlled or adjusted to produce either a bright or a softened reflection of the traffic to the rear.

The invention also has for its objects to provide a combined brilliant and subdued reflector having a common support and which may be adjusted as a unit vertically as well as horizontally to bring the selected one of the reflector surfaces to an operative, reflecting position; to provide a novel mount for plural reflectors which may be economically constructed with a minimum number of machine operations; to provide a series of reflecting surfaces of different capacities arranged in a substantially arcuate formation and adjustably mounted whereby upon the swinging of one reflector surface from an operative position another reflector surface will be moved to its operative position; and to improve the securement of the reflectors on their holder or mount.

In the drawings,

Fig. 3 is an end elevation of the same substantially as disposed in Fig. 1 and slightly adjusted from the position of Fig. 2;

Fig. 4 is a detail perspective view of the bracket part;

Fig. 5 is a like view of the rear of the holder part;

Fig. 6 is a fragmentary perspective view of the front of the holder part; and

Fig. 7 is a perspective view of one of the clamping members.

Figure 2:
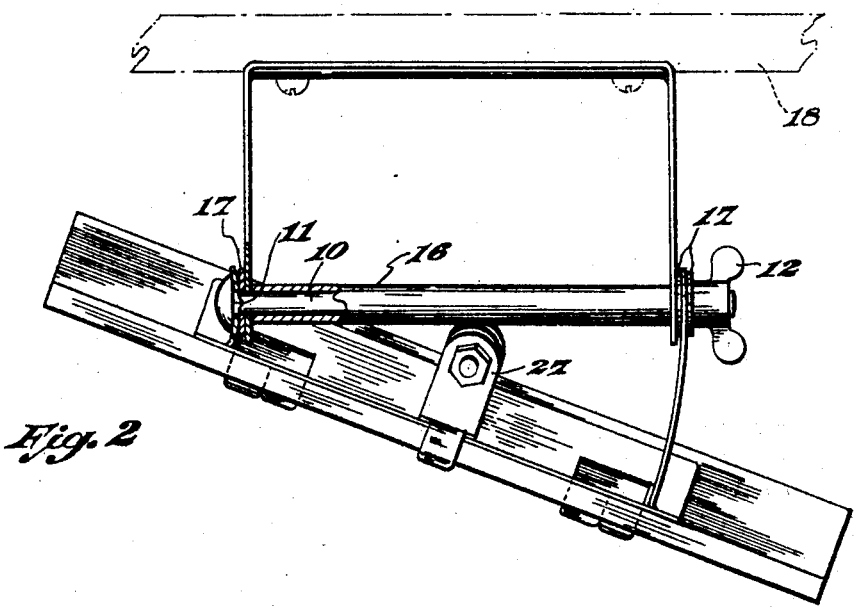
Fig. 2 is a top plan view thereof, partly in section.
Figure 1:
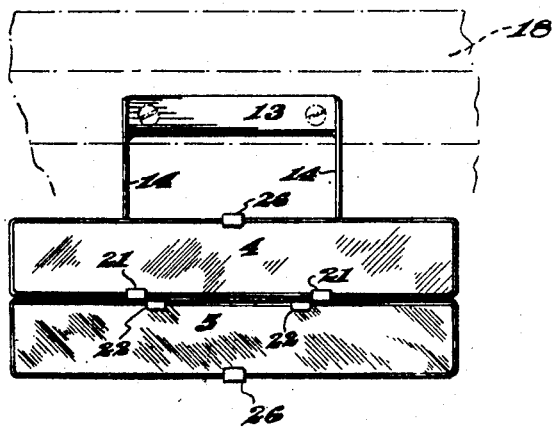
Fig. 1 is a front elevation of the improved mirror.

In proceeding in accordance with the present invention there is provided a holder plate of angular formation, being bent intermediate its upper and lower edges along a substantially horizontal line of fold 1 to form an upper wing or face portion 2 and a lower wing or face portion 3 which wings are angularly related and adapted for independently supporting the reflectors or reflector bodies 4 and 5.

The reflector 4 is preferably a clear, brightly-reflecting body, while the reflector 5 has its reflecting qualities subdued or softened to remove the bright glare from view. The holder plate is preferably formed of sheet metal and has struck rearwardly from its face portion 2 a pair of ears 6 and 7 the ear 6 being of greater length than the ear 7 and provided with a slot 8 while the ear 7 is provided with a polygonal opening 9 to receive the like sectioned shank of a bolt 10. In this particular instance, the opening 9 is squared and the portion 11 of the bolt which fits this opening is likewise squared so as to prevent turning of the bolt when the winged nut 12 is manipulated to tighten or loosen the mirror adjustment. The particular adjustment here shown is somewhat similar to that shown in the copending and joint application of John R. and Charles H. Oishei filed June 21, 1924, Serial No. 721,391, the same comprising a bracket 13 having spaced arms 14 extending forwardly therefrom and provided in their extreme free end portions with apertures 15 through which the bolt 10 is passed. Interposed between the arms 14 and surrounding the bolt is a spacer sleeve 16 and interposed between the arms, the ears and the nut 12 are suitable washers 17. The bracket 13 is fixed to the header bar 18 of the windshield frame, or on some other suitable part, and by loosening the nut 12 the supported reflector may be swung about the longitudinal axis of the bolt in an up and down direction, or about a substantially vertical axis by sliding the bolt in the slot 8. Obviously, upon tightening the winged nut the reflector is firmly secured in its set position by reason of the drawing action of the bolt head and clamping nut against the interposed spacer sleeve 16.

As above set forth the ears 6 and 7 are struck from the upper face portion 2 while forwardly from the lower face portion 3, adjacent the angle 1 is struck a pair of tongues 20, these tongues being left attached to the body of the plate at or adjacent the line of bend 1 so that when pushed outwardly they will be disposed substantially at the agle. Each tongue is divided into a pair of fingers 21 and 22, the fingers 21 being turned upwardly to engage the edge of reflector 4 while the fingers 22 are turned downwardly to engage the edge of reflector 5, thereby providing a pair of spaced overhanging fingers for each reflector-supporting face.

Intermediate the tongues 20, the lower face portion 3 has struck therefrom a stress member 23 forming a standard to which a pair of clamping members 24 are connected as by means of a screw bolt 25. Each clamping member is designed for sliding support on the rear surface of each wing with its outer terminal shaped to provide a finger 26 for engaging over the outer edge of the corresponding reflector while the inner end portion carries an ear 27 which lies substantially parallel to the interposed standard 23. These ears 27, with the interposed standard 23, are provided with registering openings through which the screw bolt 25 is passed so that when the nut 28 of said bolt is screwed home the respective ears 27 will be drawn toward the interposed standard so as to bring their respective fingers 26 into tight embrace with the outer edges of the reflectors and thereby move the inner edges of the reflectors under and into engagement with the respective fingers 21 and 22. The bolt connector 25, 28 therefore constitutes a common means for operating the two clamping members.

The faces 2 and 3 are preferably designed to support reflectors of different capacities or characters. In the disclosure the brilliant reflector 4 is supported on the upper face 2 while the subdued reflector 5 is supported on the lower face 3. In Fig. 3 the combined reflector is shown in full lines so that its subdued or night reflector 5 will be operative for reflecting traffic conditions to the rear of the driver while in dotted lines the brilliant reflector is shown adjusted to its operative position for a like purpose. It will thus be observed that either reflector may be swung from its operative position and the companion reflector moved to its operative or viewing position upon first loosening the winged nut 12, and after the desired adjustment has been effected the winged nut is then tightened. While the nut is loosened the mirror holder plate may be adjusted about axes at right angles to each other for obtaining the desired range for either mirror of the traffic conditions to the rear.

In assembling the reflectors on the body or holder plate they are seated upon their respective plate faces with the inner edges engaged beneath their respective fingers 21, 22. The fingers 26 are then engaged over the outer edges of the reflectors and screw bolt 25 tightened to draw said fingers 26 firmly over the outer edges so that the reflectors are secured to their respective faces by a tri-finger embrace in which two of the fingers engage the inner edge of each reflector and a single finger engages the outer edge of each reflector at a point substantially midway between the points of contact of the inner fingers. As the clamping bolt 25 is tightened so as to draw the clamping members 24 inwardly the standard 23 acts to retain said clamping members downwardly against the rear surfaces of the respective wings so that in this capacity the standard acts as a stress bearing member. The inner fingers 21, 22 serve to space the adjacent edges of the two reflectors a distance apart so as to accord a clear line of separation between the two reflectors to such an extent that when one reflector is operative the adjacent edge of the companion reflector will be sufficiently spaced therefrom so as to make it impossible for the motorist to have any reflected light from the inoperative reflector.

This arrangement is such that while the two reflector surfaces, which constitute a reflector unit, are nearly in the same plane, one surface is not in a position to annoyingly reflect into the eyes of the driver when the other surface is active or is in the reflecting zone or position for reflecting the traffic condition to be viewed. In this connection the angular relation of the relatively superposed mirror surfaces is such that when the lower or subdued reflector is in its operative or reflecting position the clear or bright reflector is upwardly and backwardly inclined so that the light rays from the rear of the vehicle are reflected upwardly against the roof thereof and no annoying reflection from the roof will be possible by reason of the darkness thereabout. Likewise, during day driving any incidental reflections from the downwardly inclined night reflector will not be noticeable because of the subdued or softened reflection in a decided contrast with the brightness of the images reflected from the bright reflector. Thus, the inoperative position of either reflector is such that any incidental reflections of an annoying nature are impossible. Preferably, the reflector surfaces are arranged on the exterior faces of the angular wings. They are, however, arranged on the same side of the holder so that when one surface is moved to an operative, reflecting position the companion surface is moved to a position from which annoying reflections can not come to the driver's eyes, producing the equivalent result to concealing the inoperative reflector behind a screen.

The holder plate is readily struck up from sheet metal and shaped with a minimum number of machine operations, and the resultant, angular holder plate is supported from a bracket and is adjustable thereon through a single control which is as readily manipulated as in the single reflector type of mirror, the two reflectors in this instance being adjustable as a unit under the control of a single member in the form of the nut 12. The parts 6 and 7 are struck out from the upper wing while parts 20 and 23 are struck out from the lower wing to thereby avoid unduly weakening the upper wing. The day reflector, which is used the more, is given direct support by the ears 6, 7, while the night or subdued reflector extends rearwardly or inwardly beneath the upper reflector and serves to conceal the bracket to view.

What is claimed is:

1. A rear view mirror for motor vehicles comprising a holder plate having two angularly related reflector-supporting faces, said plate having a pair of tongues struck out of one face and disposed at the angle between said faces, each tongue divided into a pair of fingers one finger of each pair being deflected over toward one face and the remaining finger deflected over toward the companion face, a reflector for and seated on each face with its inner edge engaged under and against the corresponding fingers, a standard also struck from said plate, a clamping member for each reflector engaging over the outer edge of the latter to cooperate with said fingers in holding the reflector on its plate face, a member connecting the clamp members to said standard and acting to draw said clamp member into clamping relation with the reflectors, and adjustable means for supporting the plate to present either reflector to a viewing position.

2. A rear view mirror comprising a holder plate bent along a line of fold to provide angularly related faces, and a reflector on each face, one face having a reflector-supporting part struck out to one side and left attached at the line of fold to be in a position common to both faces, clamping parts arranged at opposite sides of the plate and coacting with said common reflector-supporting part in securing both reflectors on the faces, and means for simultaneously rendering said clamping parts operative.

3. A rear view mirror comprising a holder plate bent along a line of fold to provide angularly related faces, and a reflector on each face, one face having a reflector-supporting part at the line of fold, a clamping member for each reflector engaged over the outer edge thereof and disposed at the opposite side of said plate, movable means for operating the two clamping members simultaneously to draw them cooperatively toward said reflector-supporting part, and a guide for said movable means for holding the same in a definite and operative relationship with said holder plate.

4. A rear view mirror comprising a reflector unit having adjacent angularly related upper and lower reflecting surfaces of differing characteristics, and means for pivotally adjusting the unit to present either surface to a viewing position while disposing the companion surface in a non-reflecting position.

5. A rear view mirror comprising a holder plate having adjacent reflector supporting faces, fingers struck from said plate and disposed intermediate the faces, reflectors arranged on the faces and interlocked with the fingers, clamp members engaging the reflectors and cooperating with said fingers for securing the reflectors to their respective faces, means acting to simultaneously draw the clamping members toward the fingers, and a support carried by the holder plate on the opposite side thereof from said faces for holding and defining the operative movement of said means.

6. A rear view mirror comprising a pair of relatively superposed and obliquely related reflector surfaces forming a reflex angle, one reflector surface being bright and the other reflector surface being subdued, and means supporting the two surfaces for bodily adjustment as a unit about a substantially horizontal axis for presenting either reflector surface to a viewing position.

7. A rear view mirror comprising a holder plate struck up from sheet metal and provided with two reflector-supporting faces, a reflector on each face, reflector-engaging parts pressed forwardly from the plate adjacent its bend and lying between the reflectors in interlocking engagement therewith, a clamping member for each reflector engaging over the outer edge thereof and extending over the back of said plate, a stress member carried by the holder plate extending rearwardly therefrom and between the clamping members, and an actuator for said clamping members engaged therewith and movably supported by said stress member, said actuator acting to pull the clamping members toward said reflector-engaging parts.

8. A rear view mirror comprising a holder plate struck up from sheet metal and bent to provide two exteriorly arranged and angularly related reflector-supporting faces, a reflector on each face, reflector-engaging means on the outer side of the plate adjacent its bend and lying between the reflectors in interlocking engagement therewith, a clamping member for each reflector engaging over the outer edge thereof and extending over the inwardly inclined back of said plate, said clamping members having sliding contact with the respective inwardly inclined rear surfaces of said angular faces, a stress member carried by the plate adjacent the bend, and means for operating said clamping members, said stress member acting through said means to hold said sliding members in substantial sliding contact with said inwardly inclined rear surfaces.

9. A rear view mirror comprising a holder plate having two angularly related faces, a reflector supported on each face, a clamping member engaged over the outer edge of each reflector and extending over the angular rear surface of the respective face, a stress member extending rearwardly from between the faces, each clamping member having a part extending outwardly alongside of said stress member, said clamping member parts and said stress member being provided with openings, a clamping member actuator passed through the openings of said parts and stress member and acting to draw each clamping member into clamping engagement with its respective reflector, and a support for said plate supporting the faces for both up and down and horizontal adjustment as a unit.

10. A rear view mirror comprising a holder having angularly related reflector-supporting faces, a reflector on each face, reflector-engaging means between the reflectors in interlocking engagement therewith, a clamping member for each reflector engaging an edge thereof and coacting with said reflector-engaging means in securing the respective reflector to said holder, said clamping members being disposed on the opposite sides of said reflector-engaging means, and a single means common to both clamping members for simultaneously drawing them operatively toward the interposed reflector-engaging means.

11. A rear view mirror comprising a bracket, a holder having adjacent reflector-supporting faces disposed one above the other, a reflector on each face, and an adjustable connection between the holder and the bracket for adjustably supporting the holder from one to the other of two operative positions to selectively present either reflector to a viewing position and simultaneously present the companion reflector to a non-viewing position.

12. A rear view mirror comprising a bracket, a holder thereon, a connection between the holder and bracket for adjustment of the holder about a horizontal axis, said connection supporting the holder also for adjustment about a vertical axis, and a pair of obliquely related reflectors arranged on the holder and movable as a unit with the holder about both axes and movable about either axis independently of movement about the other axis.

13. A rear view mirror comprising a holder plate having a plurality of reflector-supporting faces, a reflector carried on each face, a bracket for mounting the holder plate, a supporting part extended rearwardly from one face, means connecting said part to said bracket for adjustability of said holder plate, means for maintaining the adjustment of said holder plate whereby either reflector may be secured in a viewing position with the companion reflector in a non-viewing position, a stress member extending rearwardly from the holder plate beneath said part, and means connected to said stress member for securing the reflectors to the holder plate.

14. A combined night and day driving mirror for motor vehicles, comprising a plurality of mirror surfaces having sharply different factors of reflection, means for supporting said mirror surfaces in obtuse angular relation, means for supporting the assembly in such manner that slight angular movement of the unit changes the disposition of the mirrors so as to vary the reflections to a given point.

15. In combination an oscillatable backing strip, a high reflection mirror, and a low reflection mirror carried by said backing strip, with their faces out of parallelism.

16. In combination, a bracket, a backing strip oscillatably mounted on said bracket, the backing strip having divergent faces, a high reflection mirror imposed upon one of said faces and a low reflection mirror imposed upon the other of said faces.

17. In combination a high reflection mirror, a low reflection mirror, means for operatively supporting the mirrors one substantially vertically above the other with their faces out of parallelism but with their reflecting surfaces presenting on one side of a vertical plane behind the mirrors, means operatively connecting the mirrors and so arranged that manual manipulation of one mirror changes the face angle of the other mirror relative to the horizontal.

JOHN R. OISHEI.